Dec. 3, 1963  B. HURKO  3,113,200

OVEN LINER FOR AUTOMATIC HEAT CLEANING OVEN

Filed Oct. 5, 1962

INVENTOR.
BOHDAN HURKO
BY Richard L. Caslin
HIS ATTORNEY

United States Patent Office 3,113,200
Patented Dec. 3, 1963

3,113,200
OVEN LINER FOR AUTOMATIC HEAT
CLEANING OVEN
Bohdan Hurko, Louisville, Ky., assignor to General Electric Company, a corporation of New York
Filed Oct. 5, 1962, Ser. No. 228,554
3 Claims. (Cl. 219—35)

The present invention relates to ovens and particularly to the design of the oven liner of a high temperature domestic oven which is capable of the automatic cleaning of the inner walls of the oven liner by burning off of the food soil.

Probably the major annoyance to the housewife in using the oven is the difficulty encountered in keeping the walls of the oven liner clean. During the normal cooking operations food particles and grease spatterings often drop on the hot surfaces of the oven liner where they are partially burned so that they not only change color to a dark brown, but what is far more objectionable they adhere tenaciously to the surfaces. Strong cleaning agents have been provided for application to the oven liner walls for the express purpose of removing food soil from them, but even the better of these cleaning agents requires strong rubbing action; and in any event it is very difficult and a laborious operation to reach all areas for the oven liner.

This invention has been designed for use in an automatic heat cleaning oven of the general type that is disclosed and claimed in the copending application of the present applicant Serial No. 27,926, filed May 9, 1960, entitled "Automatic Oven Cleaning" that was abandoned in favor of a continuataion-in-part application Serial No. 244,493 that was filed on December 13, 1962, which application is assigned to the General Electric Company the assignee of the present invention. As there described and claimed, the oven is provided with an automatic cleaning cycle where the temperature of the oven is raised to a heat cleaning temperature in the range between 750° F. and 950° F. so as to burn off all food soil and leave the walls of the oven liner perfectly clean.

The principal object of the present invention is to provide an automatic heat cleaning oven with an oven liner having at least one wall substantially covered with a plurality of shallow recesses for separating the food soil into a large number of small soiled areas so as to increase the speed of burning off the soil.

A further object of the present invention is to provide means in the oven liner of a heat cleaning oven for increasing the speed of the cleaning process by separating the food soil into a large number of small areas so as to increase the ratio of the circumference of the soiled spots to the area of the soiled spots for obtaining the benefit of the higher oxygen to soil ratio at the periphery of the soiled spots.

The present invention, in accordance with one form thereof, embodies a novel oven liner for a domestic oven where the oven liner has walls forming an oven cavity. One wall of the cavity would include a door for gaining access thereto. The oven includes heating means for the normal cooking operations up to a maximum temperature of about 550° F. Automatic cleaning means are also provided for operating the heating means to a high temperature between about 750° F. and 950° F. for burning off the food soil that adheres to the walls of the oven liner. Such a cooking apparatus is as taught by the above-mentioned Hurko application Serial No. 27,926. It has been discovered that the speed of burning off the food soil can be increased substantially by separating the soil into a plurality of pools of small area and shallow depth rather than to allow the soil to accumulate in one large puddle in the bottom of the oven liner. Laboratory tests have shown that the spots of soil on the oven liner clean first on the edges or periphery and that the cleaning effect moves toward the center. It is proposed to cover at least the bottom wall of the oven liner with a plurality of shallow recesses or embossments that are closely spaced to each other so that the food soil that accumulates on the bottom wall will be separated into a plurality of shallow pools so that each soil spot will form a thin wedge and there will be a higher oxygen to soil ratio thereby increasing the speed of combustion or burning. It is understood however that a similar embossed pattern could be adopted for the remaining walls of the oven liner in order to improve the speed of automatic heat cleaning.

My invention will be better understood from the following description taken in conjunction with the accompanying drawing and its scope will be pointed out in the appended claims.

Figure 1:
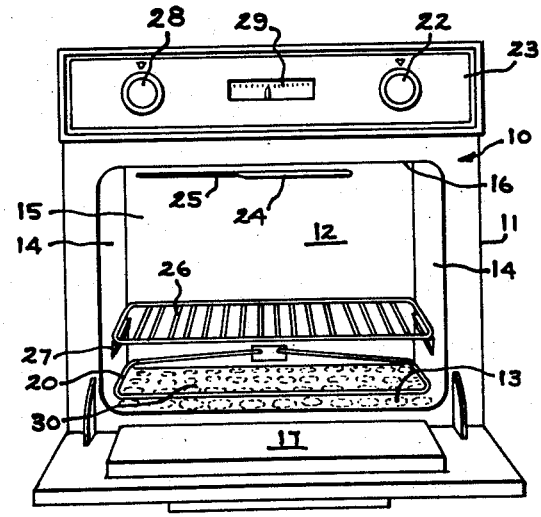
FIGURE 1 is a front elevational view of a built-in wall oven with the door open to show the embossed bottom wall of the oven liner of the present invention.

Turning now to a consideration of the drawing and in particular to FIGURE 1, there is shown one embodiment of this invention comprising a built-in wall oven 10 having a cabinet structure 11 in which is assembled a box-like oven liner 12 which has a bottom wall 13, opposite side walls 14, a back wall 15, and a top wall 16. These walls of the oven liner 12 co-operate with a front opening hinged door 17 for forming an oven cavity. It will be apparent to those skilled in this art that this oven liner would be covered with heat insulation material (not shown) that is located between the outer surfaces of the oven liner and the cabinet structure 11 so as to retain as much of the heat as possible within the oven cavity.

Heat is supplied to the oven cavity by suitable electric resistant elements only one of which is shown; namely, bake unit 20 located adjacent the bottom wall 13 of the oven liner, which is of course standard in electric ovens. This bake unit 20 is a metal sheathed heating element of sandard design which comprises a helical resistance coil extending nearly the entire length thereof, and this coil is embedded in an insulating material such as magnesium oxide which is in turn covered with a metal sheath. A suitable heat cleaning oven would also include a broil unit (not shown) located beneath the top wall 16 of the oven liner and possibly a third heating element or a mullion heater (not shown) wrapped around the inside of the oven liner around the door opening and adjacent the front of the oven as is taught by the copending Hurko application mentioned previously. Suitable temperature sensing means must be provided for the oven cavity for governing the maximum temperature settings of a thermostat 22 located within the control panel 23 that is positioned above the oven liner in a typical built-in wall oven. The temperature sensing means is shown as a thermostatic bulb 24 that is positioned on the end of a capillary tube 25. This tube is connected at its opposite end to the hydraulic thermostat 23, it being assumed that there is the hydraulic fluid available for use with this thermostat 22 that would be operable at these extremely high temperatures in the vicinity of 950° F. Since this temperature sensing and controlling system does not form part of the present invention, it will not be further discussed. A hydraulic thermostat system has been shown merely as an illustration of a temperature control means. Understandably, a differential expansion thermostat having two different types of metal, one located within a tube of the other metal could be used satisfactorily.

Also shown within the oven cavity is a wire rack or shelf 26 which is supported on shelf supports 27 from the side walls of the oven liner. The control panel 23 also includes an oven selector switch 28 for changing the circuit arrangement of the various heating elements of the oven. A temperature control dial 29 is also included for cooperation with the thermostat 22.

Figure 2:
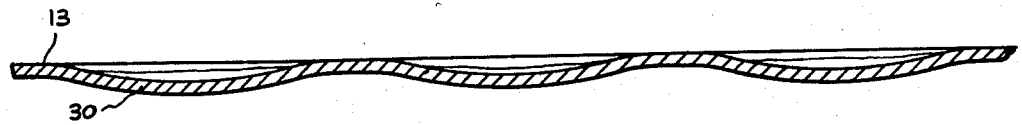
FIGURE 2 is an enlarged fragmentary cross sectional elevational view through the bottom wall of the oven liner of FIGURE 1 to show the shape and depth of the recesses or embossments in said bottom wall.
Figure 3:
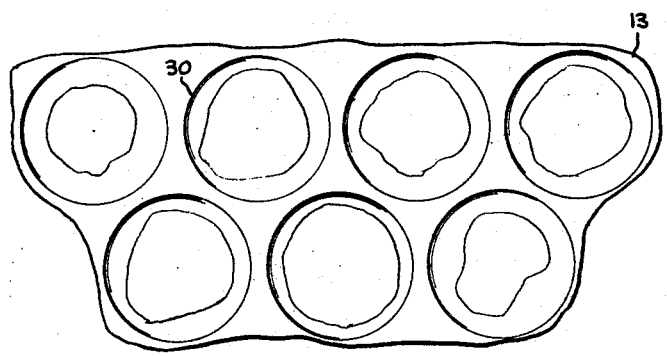
FIGURE 3 is a fragmentary top plan view of a small portion of the bottom wall of the oven liner with food soil deposited in the embossments in wafer thin pools.

The detailed information of the oven design which has been mentioned above was presented in order to set the stage for an explanation of the invention which is being claimed herein. The bottom wall 13 of the oven liner 12 is illustrated as being covered with a plurality of circular embossments or recesses 30. It should be understood that it is difficult in such a small size view to illustrate the relative size and number of such embossments. A preferred example would be an embossment having a diameter of about 2¼ inches and having a between center dimension of about 2½ inches as well as having a maximum depth of about 0.100 inch where the embossment is drawn as the segment of a sphere having a radius of approximately 5 inches as is clear from the cross sectional elevational view of FIGURE 2. The avowed purpose of this plurality of embossments 30 is to divide the soil that is deposited on the bottom wall into a plurality of small shallow pools rather than to allow the soil to accumulate in a large puddle in the bottom of the oven. It was discovered during many laboratory tests of the operation of a heat cleaning oven that areas of soil on the oven liner are cleaned first on the edges during the automatic heat cleaning cycle. This cleaning effect starts around the periphery of the soiled area and moves toward the center. It is believed that this action is due to the fact that the smaller soil spots are formed in the shape of a thin wedge and there is a higher oxygen to soil ratio for the small pools. Moreover, the ratio of the circumference of the soil spot to the total area of the soil would increase considerably and hence the cleaning process will be accelerated. Lastly, the embossed bottom wall of the oven liner will secure more even soil distribution over the bottom wall because the average thickness of the soil spots is in most cases proportional to the area of the soiled spot. By this is meant that the larger the spot the thicker the layer will be, while the smaller the spot the thinner the layer.

Having described above a novel design of the oven liner of an automatic heat cleaning oven it will be appreciated that those skilled in this art that the bottom wall of the oven liner will generally contain more of the soil than the other walls, but it might be deemed advantageous to provide the embossed surface to the other walls of the oven liner and particularly the side walls and back wall. The top wall 16 of the oven liner is the one that receives the least of the soil in normal cooking operations.

Modifications of this invention will occur to those skilled in this art and it is to be understood, therefore, that this invention is not limited to the particular embodiments disclosed but that it is intended to cover all modifications which are within the true spirit and scope of this invention as claimed.

What I claim as new and desire to secure by Letters Patent of the United States is:

1. A cooking apparatus comprising an oven liner having walls forming an oven cavity, one wall of the cavity including a door for gaining access thereto, heating means supplied for the cavity for normal cooking operations up to a maximum temperature of about 550° F., and cleaning means operable for the automatic cleaning of the inner walls of the oven liner and causing the heating means to raise the temperature of the cavity above the normal cooking temperatures to a maximum temperature in the range of from 750° F. to 950° F. and thereby burn off the food soil adhering to the cavity walls; the invention comprising a bottom wall of the oven liner that is substantially covered with a plurality of shallow embossments that are concave upwardly, where each embossment has a curved bottom wall with a depth that is gradually increasing inwardly of the periphery thereof to a maximum depth adjacent the center of about 0.100 inches so that food soil accumulating on the bottom wall of the oven liner will be separated by the embossments into a large number of small shallow pools whereby the soil spots will have a thin wedged-shaped periphery so as to increase the speed of burning away the food soil.

2. A cooking apparatus comprising an oven liner having walls forming an oven cavity, one wall of the cavity including a door for gaining access thereto, at least the bottom wall of the oven liner being substantially covered with a plurality of shallow embossments that are concave upwardly where each embossment is about 2 inches in diameter and has a curved bottom wall of gradually increasing depth inwardly of the periphery thereof so that food soil accumulating on the said bottom wall will be separated into a large number of small shallow pools whereby the soil spots will have a thin wedged-shaped periphery, the apparatus including heating means supplied to the cavity for normal cooking operations up to a maximum temperature of about 550° F., and cleaning means operable for the automatic cleaning of the inner walls of the oven liner for causing the heating means to raise the temperature of the cavity above the normal cooking temperatures to a maximum temperature between about 750° F. and 950° F. and thereby burn off the food soil adhering to the oven liner walls, the said embossments serving to spread the food soil into a plurality of thin layers so as to increase the speed of burning off the soil.

3. In combination a high temperature cooking apparatus comprising a cabinet structure and an oven liner having walls forming an oven cavity where one wall of the cavity includes a door for gaining access thereto, heating means provided for the cavity for both normal cooking operations up to a maximum temperature of about 550° F. and an automatic heat cleaning temperature up to a maximum of between 750° F. and 950° F. for burning off the food soil that adheres to the oven liner walls, at least the bottom wall of the oven liner being a flat sheet that is substantially covered with a plurality of shallow recesses where the bottom wall of each recess is of gradually increasing depth inwardly of the periphery thereof so that food soil accumulating on the oven liner walls will be separated into a large number of small shallow pools that are closely spaced to each other whereby the soil spots will have a thin wedge-shape periphery so as to increase the speed of burning away the food soil.

References Cited in the file of this patent

UNITED STATES PATENTS

| | | |
|---|---|---|
| 1,456,873 | Forshee | May 29, 1923 |
| 2,224,945 | Ames | Dec. 17, 1940 |
| 2,247,626 | Ames | July 1, 1941 |
| 2,300,837 | Ames | Nov. 3, 1942 |
| 2,718,854 | Michaelis | Sept. 27, 1955 |